US009185270B2

(12) United States Patent
Bienvenu et al.

(10) Patent No.: US 9,185,270 B2
(45) Date of Patent: Nov. 10, 2015

(54) GHOST ARTIFACT DETECTION AND REMOVAL IN HDR IMAGE CREATION USING GRAPH BASED SELECTION OF LOCAL REFERENCE

(71) Applicant: KONICA MINOLTA LABORATORY U.S.A., INC., San Mateo, CA (US)

(72) Inventors: Alexis Bienvenu, Méré (FR); Michel Julien Vidal-Naquet, San Mateo, CA (US)

(73) Assignee: KONIA MINOLTA LABORATORY U.S.A., INC., San Mateo, CA (US)

( * ) Notice: Subject to any disclaimer, the term of this patent is extended or adjusted under 35 U.S.C. 154(b) by 80 days.

(21) Appl. No.: 14/194,168

(22) Filed: Feb. 28, 2014

(65) Prior Publication Data
US 2015/0249774 A1    Sep. 3, 2015

(51) Int. Cl.
*G06K 9/40*      (2006.01)
*H04N 5/21*      (2006.01)

(52) U.S. Cl.
CPC ..................................... *H04N 5/211* (2013.01)

(58) Field of Classification Search
None
See application file for complete search history.

(56) References Cited

U.S. PATENT DOCUMENTS

| | | | | |
|---|---|---|---|---|
| 7,970,170 | B2 * | 6/2011 | Tener et al. | 382/103 |
| 2010/0271512 | A1 * | 10/2010 | Garten | 348/239 |
| 2011/0075151 | A1 * | 3/2011 | Jeong | 356/453 |
| 2011/0211732 | A1 * | 9/2011 | Rapaport | 382/107 |
| 2011/0254976 | A1 * | 10/2011 | Garten | 348/229.1 |
| 2011/0310970 | A1 * | 12/2011 | Lee et al. | 375/240.16 |
| 2012/0141029 | A1 * | 6/2012 | Cha et al. | 382/171 |
| 2012/0288217 | A1 * | 11/2012 | Zhai et al. | 382/294 |
| 2014/0307044 | A1 * | 10/2014 | Sharma et al. | 348/36 |
| 2015/0002689 | A1 * | 1/2015 | Weissman et al. | 348/222.1 |

OTHER PUBLICATIONS

Srikantha et al., "Ghost Detection and Removal for High Dynamic Range Images: Recent Advances", Signal Processing: image Communications, 27(6), pp. 650-662, 2012.
Karadag et al., "Color Preserving HDR Fusion for Dynamic Scenes", Journal of WSCG 20(2): 155-160 (2012).
Wikipedia, "Max-flow min-cut theorem", "http://en.wikipedia.org/wiki/Max-flow_min-cut_theorem", 4 pages, printed from the Internet on Jan. 22, 2014.
Wikipedia, "Minimum cut", "http://en.wikipedia.org/wiki/Minimum_cut", 2 pages, printed from the internet on Feb. 26, 2014.

* cited by examiner

*Primary Examiner* — Bhavesh Mehta
*Assistant Examiner* — Feng Niu
(74) *Attorney, Agent, or Firm* — Chen Yoshimura LLP (57) ABSTRACT

In high dynamic range (HDR) image creation, a ghost artifact detection method divides the images (brackets) into multiple tiles, and selects one bracket for each tile as the local reference bracket. The local reference brackets are selected via optimization of an objective function which includes both a component that measures exposure quality of individual tiles and a component that measures correlation between neighboring tiles. The minimization can be realized by constructing a graph for the objective function and calculating a minimum cut of the graph using a graph cut algorithm. Graph examples for three and four image sets are given. Ghost artifact detection is then performed on a tile-by-tile basis by using the local reference bracket for each tile. Ghost maps are generated this way and used for HDR image creation. This method minimizes artifacts due to inconsistencies in local reference bracket selection in areas involved in ghost-inducing objects.

15 Claims, 6 Drawing Sheets

Fig. 7

GHOST ARTIFACT DETECTION AND REMOVAL IN HDR IMAGE CREATION USING GRAPH BASED SELECTION OF LOCAL REFERENCE

BACKGROUND OF THE INVENTION

1. Field of the Invention

This invention relates to high dynamic range (HDR) imaging, and in particular, it relates to removal of ghost artifact during HDR image creation.

2. Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of the image sensor of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking a set of multiple images of the same scene at various exposure levels, and then digitally merging the multiple images to create an HDR image that contains information from the original multiple images, so that details in both brighter and darker areas are adequately expressed in the HDR image. Methods for creating an HDR image from a set of multiple images are generally known.

Bracketing is a technique in photography for taking multiple images of the same scene using different exposure levels or other different setting values such as focus, depth of field, etc. Some cameras can perform autobracketing, i.e., automatically changing the setting multiple times and take multiple images. Each of the multiple images is sometimes referred to as a bracket. Multiple images generated by exposure bracketing can be used to create HDR images.

During HDR image creation, ghosting artifacts can appear when object have moved, appeared or disappeared in between the shooting of the different images (brackets). For example, during the shooting of three brackets, if a person walks into the scene only in the third bracket, then the HDR image created from the three brackets will have a semi-transparent figure of the person over the scene ("ghost"). These objects are referred to as moving objects or ghost-inducing objects in this disclosure.

Methods have been proposed to identify such ghost-inducing objects within the multiple images, so that the images can be processed to reduce or eliminate ghosting effects in the resulting HDR image. Some of these techniques are described in a review paper, A. Srikantha and D. Sidibé, Ghost Detection and Removal for High Dynamic Range Images: Recent Advances, Signal Processing: image Communications, 27(6), pp. 650-662, 2012.

In some known ghost artifact detection method, one of the multiple brackets is selected as the reference image (also referred to as a background image), which is the image that by definition does not contain any ghost-inducing objects. Other brackets are compared to the reference image to determine whether and where ghost-inducing objects are present. An advantage of such a single reference approach is that it simplifies the ghost detection and removal problem, because when processing each non-reference bracket, only two images (the reference bracket and the non-reference bracket) need to be compared to detect non-consistent pixels. A disadvantage, however, is that some large areas of the reference image may be badly exposed (either over or under exposed) and, if used as reference, result in unreliable ghost detection, lost of information and poor quality of the resulting HDR image in the relevant areas.

Thus, a method has been proposed to divide each image into multiple tiles (all brackets are divided into the same tiles), and for each tile, one bracket is selected as the reference image, so that different brackets may be selected as the reference bracket for different tiles. The selected bracket for each tile is referred to as local reference or local background. One such method is described in Gökdeniz Karadag and Ahmet Oguz Akyüz, Color preserving HDR Fusion for Dynamic Scenes, Journal of WSCG 20(2): 155-160 (2012) ("Karadag and Akyuz 2012"). FIG. 2, which is adapted from FIG. 1 of the Karadag and Akyuz 2012 paper, shows an image divided into multiple tiles; tiles labeled "S" (near the upper right hand and lower right hand corners of the image) indicate tiles for which the short exposure bracket will be used as the reference image, and tiles labeled "L" (near the center of the image) indicate those for which the long exposure bracket will be used (this image set had a total of three brackets). For the other tiles, the middle bracket will be used as the reference but for simplicity these tiles are not labeled in FIG. 1. After the reference bracket is selected for each tile, ghost pixels are detected in the non-reference brackets.

SUMMARY

The method described in the Karadag and Akyuz 2012 paper has a problem which occurs when neighboring tiles are involved with the same moving object but have different brackets chosen for them as reference images. For example, if a moving object O is present in neighboring tiles A and B in bracket #1 but not in brackets #2 and #3, and if bracket #1 (having the object O) is selected as the reference bracket for tile A and bracket #2 (having no object O, only the scene behind the object O) is selected as the reference bracket for tile B, then in the resulting HDR image, tiles A and B may appear visibly inconsistent or information in the parts of tiles A or B involved with the moving object may be lost.

Accordingly, the present invention is directed to a method and related apparatus for ghost artifact detection and removal that substantially obviates one or more of the problems due to limitations and disadvantages of the related art.

An object of the present invention is to provide an improved method for detecting ghost artifacts in HDR image creation.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a high dynamic range (HDR) image from a set of multiple input images, each input image being assigned a bracket index, which includes: (a) dividing each input image into a set of tiles, wherein all images are divided into the same set of tiles; (b) determining a reference bracket index for each tile of the set of tiles, comprising: (b1) defining an objective function as a function of a set of bracket indices for the set of tiles, the objective function including a component that measures exposure quality of individual tiles and a component that measures correlation between neighboring tiles; and (b2) calculating a set of reference bracket indices for the tiles that optimizes the objective function; (c) based on the set of reference bracket indices for the tiles, detecting ghost-inducing pixels in the set of input image on a tile-by-tile basis by comparing, for each tile, each input image whose bracket index is not the reference bracket index with the input image whose bracket index is the reference bracket index, and generating a ghost map for each input image which indicates ghost-inducing pixels in that image; and (d) generating a HDR image using the set of input images and the corresponding ghost maps.

Step (b2) may include: constructing a graph based on the objective function such that an optimum cut of the graph gives a set of bracket indices for the tiles that optimizes the objective function; and calculating an optimum cut of the graph using a graph cut algorithm to obtain the set of reference bracket indices for the tiles that optimizes the objective function.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for detecting ghost artifact in multiple images for HDR image creation. The multiple images (brackets) are obtained by photographing the same scene at different exposure levels. It is assumed that the camera does not move substantially during the photographing process; however, objects may move within the scene, or appear into or disappear from the scene during the process. Such objects are collectively referred to as moving objects or ghost-inducing objects in this disclosure. If untreated, the moving objects will induce ghost artifact in the resulting HDR image. The ghost artifact detection method identifies areas of the images that contain such moving objects that may induce ghost artifact. It should be noted that although the method is referred to as a ghost artifact detection method, it does not detects ghost artifacts in an HDR image after it has been created. Rather, the method detects regions in the original multiple images that, if untreated, will induce ghost artifacts in the HDR image.

Similar to some known methods, e.g. that described in the Karadag and Akyuz 2012 paper, a method according to embodiments of the present invention divides the whole images into multiple tiles (all brackets are divided into the same tiles), and for each tile, one bracket is selected as the reference bracket (local reference). Embodiments of the present invention differ from the known methods in how the reference brackets are selected for the tiles. The method according to embodiments of the present invention determines the local reference, i.e., which bracket is to be used as the reference for each tile of the image, while minimizing artifacts due to inconsistencies between neighboring tiles. Thus, the method attempts to ensure that in dynamic areas of the scene (i.e. areas involving moving objects), the same reference bracket is selected for neighboring tiles. According to embodiments of the present invention, the reference bracket for each tile is selected via optimization of an objective function that takes into account both exposure quality of the tiles and the consistency of neighboring tiles.

Figure 1:
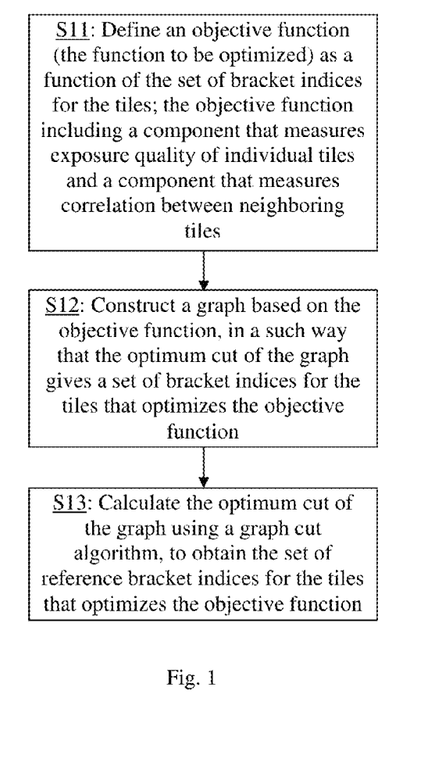
FIG. 1 schematically illustrates a method for ghost artifact detection and HDR image creation according to an embodiment of the present invention.
Figure 2:
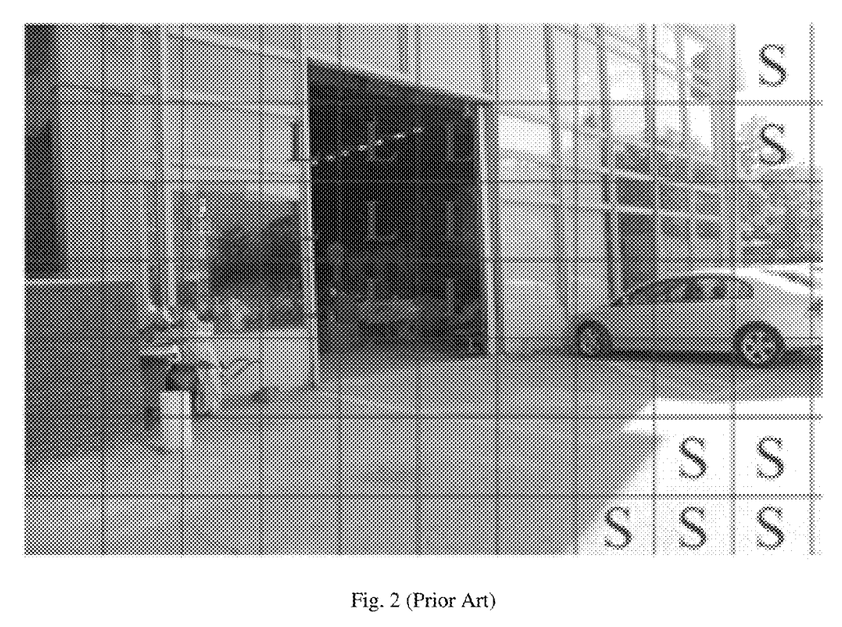
FIG. 2 illustrates an image divided into multiple tiles where different brackets selected as reference bracket for different tiles according to a known method.

According to an embodiment of the present invention, the method of determining the reference bracket for each tile includes the following steps, schematically shown in FIG. 1. First, an objective function (the function to be optimized) is defined as a function of the set of bracket indices for the set of tiles (step S11). The objective function includes a component that measures exposure quality of individual tiles and a component that measures correlation between neighboring tiles. A graph is then constructed based on the objective function (step S12). Then, the optimum cut of the graph is calculated using a graph cut algorithm (step S13). The graph is constructed in step S12 in such a way that the optimum cut calculated in step S13 gives a set of bracket indices for the tiles that optimizes the objective function, which are to be used as the reference brackets for purposes of ghost artifact detection and removal.

In one embodiment, the objective function F is defined as follows (Equation (1)):

$$F(f) = \Sigma_p D_p(f_p) + \Sigma_p \Sigma_{q \in N(p)} V_{p,q}(f_p, f_q) \quad (1)$$

where: p and q are indices of tiles; N(p) is a set of tile indices of neighbors of tile p; $f_p$ and $f_q$ are the bracket indices for tiles p and q (for example, if there are a total of three brackets, each bracket index can take values 0, 1 or 2); $f$, which is a vector formed by $f_p$, is the vector to be optimized; $D_p(f_p)$ is a function which measures the exposure quality (also referred to as well-exposedness in HDR literature) of tile p of the bracket $f_p$; and $V_{p,q}(f_p, f_q)$ is a function which measures the coupling between two neighboring tiles p, q in brackets $f_p$, $f_q$.

The objective function F($f$) is a function of vector $f$; the optimization problem is to find the optimum vector $f$ that optimizes the function F($f$). This optimum vector $f$ will give, for each tile p, the bracket index that should be selected as the reference bracket for that tile for purposes of ghost artifact detection and removal.

Depending on the definition of $D_p(f_p)$ and $V_{p,q}(f_p, f_q)$, optimization of $F(f)$ may be minimization or maximization. In various embodiments described below, the objective function $F(f)$ is defined such that it is to be minimized.

It can be seen that the objective function F includes both a component (D) that measures tile exposure quality of individual tiles and a component (V) that measures tile-to-tile correlation between neighboring tiles. This second component (V) can serve as an indication of whether neighboring tiles contain the same objects. Including the second component (V) can help reduce the occurrence of change of reference brackets that cuts or divides a ghost-inducing object.

Figure 3:
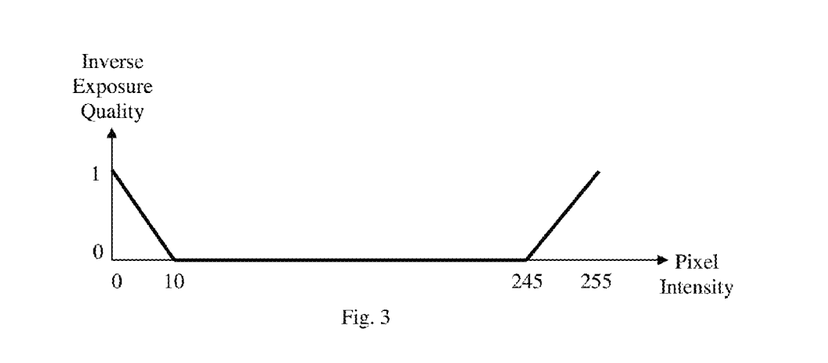
FIG. 3 schematically illustrates an inverted pixel exposure quality function useful in an embodiment of the present invention.

In one embodiment, the exposure quality value $D_p(f_p)$ for tile p and bracket $f_p$ is the average value of the pixel exposure quality values for all pixels of that tile and that bracket. For each pixel, the exposure quality value is a function of pixel intensity; generally speaking, it has values indicating good exposure if the pixel intensity is within a middle section of the pixel intensity range, and values indicating poor exposure if the pixel intensity is above or below the middle section. In one particular example, the pixel intensity range (i.e. possible pixel values) is 0 to 255 and the middle section is 10 to 245. When the objective function F is to be minimized, the exposure quality values indicating good exposure will be lower than those indicating poor exposure. In one particular example, the value indicating good exposure is 0 and the values indicating poor exposure are between 0 and 1. An example of the pixel exposure quality value as a function of pixel intensity is shown in FIG. 3, where the exposure quality value is 0 in the middle section and increase from 0 to 1 as the pixel intensity approaches the two ends of the intensity range. Note that such a function may be referred to as an "inverse" exposure quality function because as a matter of convention, a higher value for "quality" is associated with "better," while in this example a lower exposure quality value corresponds to better exposure, i.e. not over or under exposed. The pixel exposure quality function may have a reversed shape if the objective function F is to be maximized. Any suitable shapes may be used for the pixel exposure quality function.

Figure 4:
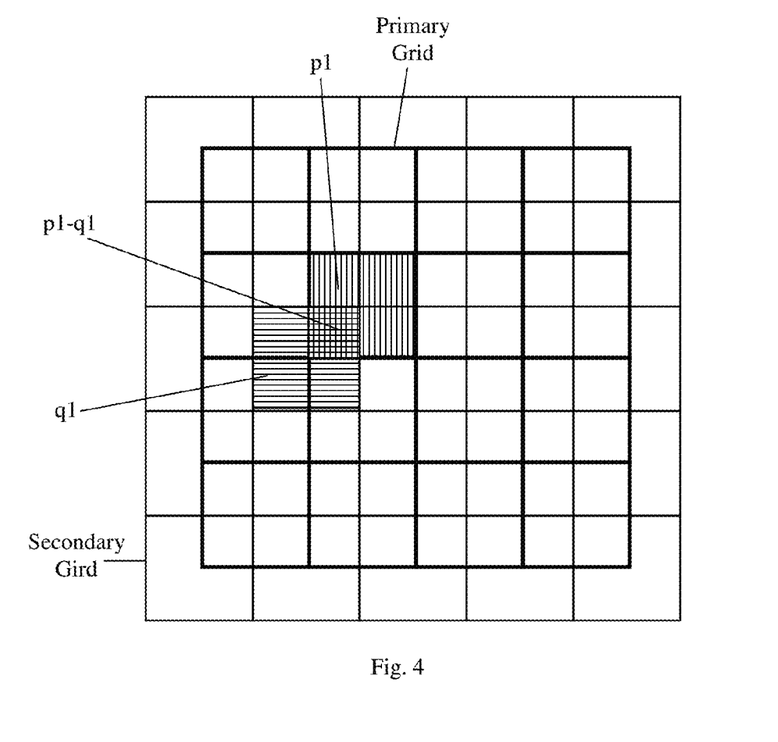
FIG. 4 schematically illustrates a primary tile grid and a secondary tile grid used for calculating tile-to-tile correlation according to an embodiment of the present invention.

In one embodiment, the tile-to-tile correlation value V is calculated by constructing two tile grids (a primary tile grid and a secondary tile grid) from the image, as schematically illustrated in FIG. 4. Each tile grid is formed of tiles of identical size and shape abutting each other; the two tile grids have the same tile size, shape and arrangement. In a preferred embodiment shown in FIG. 4, the tiles are rectangular or square in shape and aligned horizontally and vertically forming a regular grid. Other tile shapes and arrangements can also be used. In one implementation, each tile is 20×18 pixels in size. The primary tile grid (shown in thicker lines in FIG. 4) is one that divides the whole image; the secondary tile grid (shown in thinner lines in FIG. 4) is shifted laterally with respect to the primary tile grid by one half of a tile height and one half of a tile width. The secondary tile grid may extend beyond the boundaries of the image by one half of the tile height and width, respectively (as schematically shown in FIG. 4), or it may be smaller than the image by one half of the tile height and width.

In Equation (1), tile indices p and q refer to tiles in the primary and secondary tile grids, respectively. For each tile p in the primary tile grid, its set of neighboring tiles N(p) consists of the four tiles in the secondary tile grid that partially overlap tile p. FIG. 4 shows a tile p1 (shaded with vertical lines) in the primary tile grid and one of its neighboring tiles q1 (shaded with horizontal lines) in the secondary tile grid. Conversely, each tile q in the secondary tile grid has four neighboring tiles in the primary tile grid. Because a given tile in the secondary grid connects to four different tiles of the primary grid, neighboring tiles of the primary grid are connected indirectly via overlapping tiles of the secondary grid.

In Equation (1), the function $V_{p,q}(f_p, f_q)$, which is a measure of correlation between the tile p and its neighboring tile q, is defined using the parts of tiles p and q that overlap with each other (e.g., the part shown in FIG. 4 that is shaded by both vertical and horizontal lines and labeled "p1–q1"). In one implementation, the correlation is calculated using the normalized cross-correlation (NCC) of the overlapping parts of the two tiles. For example, $V_{p,q}(f_p, f_q)$ may be defined as a monotonous function of NCC.

Mathematically, the NCC between any two image patches X and Y of the same size is given by the following formula:

$$NCC(X,Y) = \frac{\sum_{i=1}^{N}(X_i - \overline{X})(Y_i - \overline{Y})}{\sqrt{\left[\sum_{i=1}^{N}(X_i - \overline{X})^2 \sum_{i=1}^{N}(Y_i - \overline{Y})^2\right]}}$$

where $$\overline{X} = \frac{1}{N}\sum_{i=1}^{N} X_i \text{ and } \overline{Y} = \frac{1}{N}\sum_{i=1}^{N} Y_i.$$

NCC has the property that NCC(X,aY+b)=NCC(X,Y), where a and b are constants. Thus, NCC is invariant to changes in exposure level and contrast.

One particular example of the definition of $V_{p,q}(f_p, f_q)$ is set forth below (Equation (2)):

$$V_{p,q}(f_p, f_q) = 0.3 + \exp(18*(1-NCC)*(1-NCC)) \qquad (2)$$

where NCC is shorthand for $NCC_{p,q}(f_p, f_q)$, the normalized cross-correlation of the overlapping parts of tiles p and q for brackets $f_p$ and $f_q$. This function is constructed based the following considerations: The exponential function accounts for the very steep penalty needed for undesirable low NCC. The square reflects tolerance to high value of NCC (e.g. between 0.8 and 1). The constant term (e.g. 0.3) has the effect of keeping the same reference bracket if exposure levels are close. With this definition, $V_{p,q}(f_p, f_q)$ represents the confidence that selected brackets for tiles p and q represent the same image content (i.e., the same object). If brackets $f_p$ and $f_q$ represent image content that is not from the same object, then $V_{p,q}(f_p, f_q)$ is likely to be low because the NCC, measuring the correlation of image content between the overlapping corners of both tiles, will be low. Other suitable monotonous functions of NCC may be used as well. In alternative implementations, NCC can be replaced by other suitable functions that measure visual similarity between images; such functions should be invariant to exposure level and contrast.

In Equation (1), the tile exposure quality value $D_p(f_p)$ is summed over all tiles p of the primary tile grid, and the tile-to-tile correlation function $V_{p,q}(f_p, f_q)$ is first summed over all neighboring tiles q∈N(p) of each tile p and then summed over all tiles p of the primary tile grid.

As mentioned earlier, the goal of the optimization is to find the vector $f=\{fp\}$ that optimizes (minimizes or maximizes)

the objective function F($f$) (Equation (1)). That optimum vector $f$ will give the reference bracket for each tile p, to be used for ghost artifact detection and HDR image creation. The optimization problem is solved by constructing a graph representing the function F, and finding an optimum cut of the graph. The construction of the graph (step S12 in FIG. 1) is described below with reference to FIGS. 5A and 5B. In the description below, an image set having three brackets is used as an example, but the method can be expanded to other numbers of brackets.

Figure 5A:
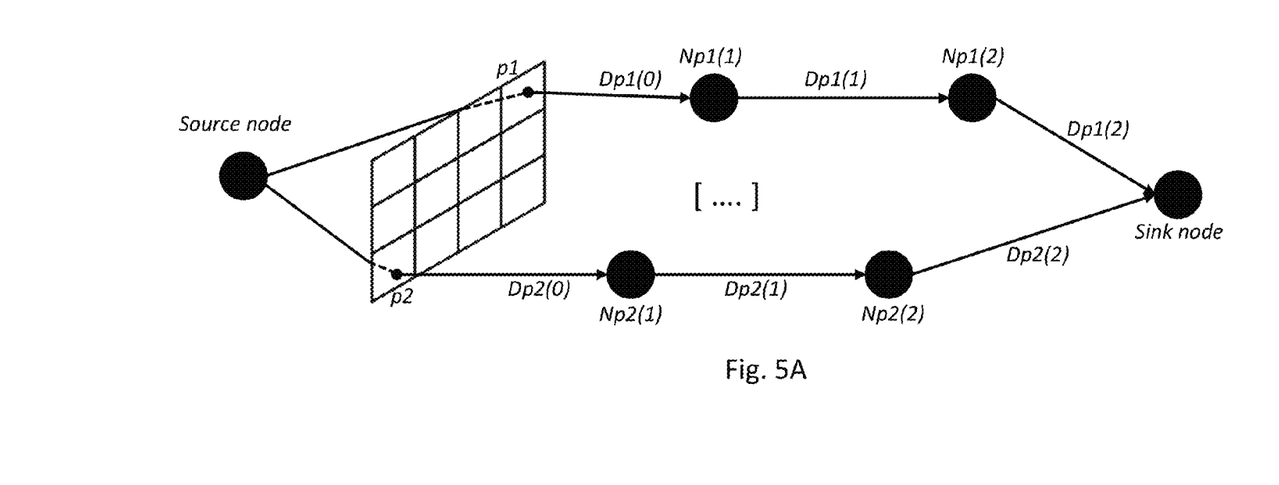
FIGS. 5A and 5B schematically illustrate graph construction for a set of three input images according to an embodiment of the present invention.

As shown in FIG. 5A, the graph has a source node and a sink node, and a plurality of intermediate nodes. Corresponding to each tile p in the primary tile grid, two intermediate nodes Np(1) and Np(2) are provided; the number of intermediate nodes corresponding to each tile is the number of brackets minus 1. Corresponding to each tile p, three edges are provided, linking the source node to the first intermediate node, the first intermediate node to the second intermediate node, and the second intermediate node to the sink node, respectively. The weights assigned to the three edges are $D_p(0)$, $D_p(1)$, and $D_p(2)$, respectively, where $D_p(f_p)$ ($f_p$=0, 1, 2) are the exposure quality values for tile p in the three brackets 0, 1, 2, as described above in connection with Equation (1). In other words, the three edges represent the three brackets 0, 1, 2 for tile p, and the edge weights represent the respective tile exposure quality $D_p$. For simplicity, FIG. 5A shows a part of the graph (a sub-graph) including intermediate nodes corresponding to only two tiles p1 and p2 of the primary tile grid, namely, Np1(1), Np1(2), Np2(1) and Np2(2).

Figure 5B:
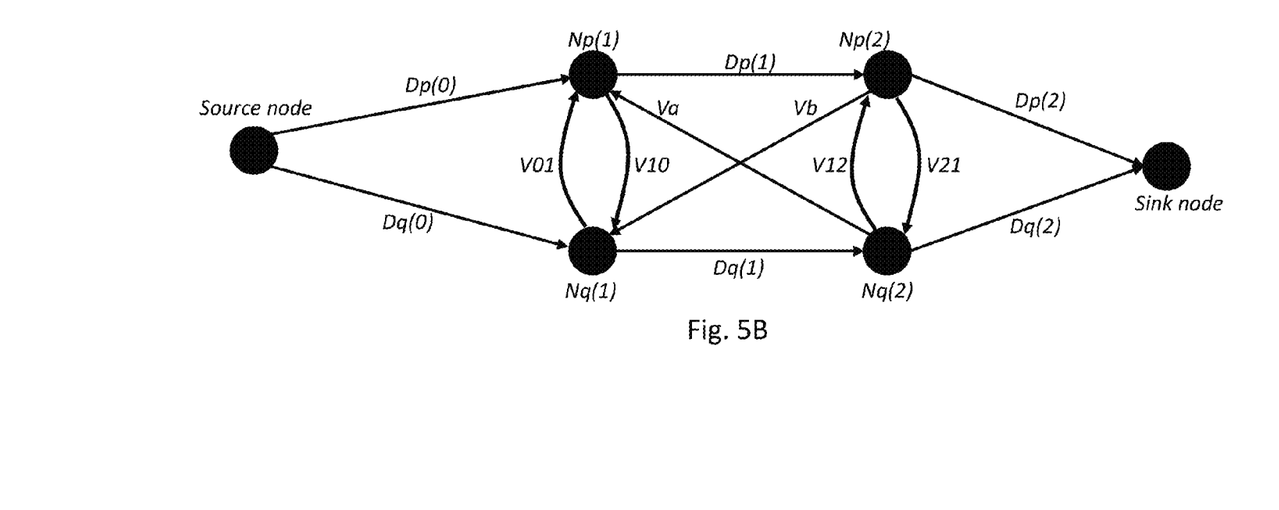
Figure 6A:
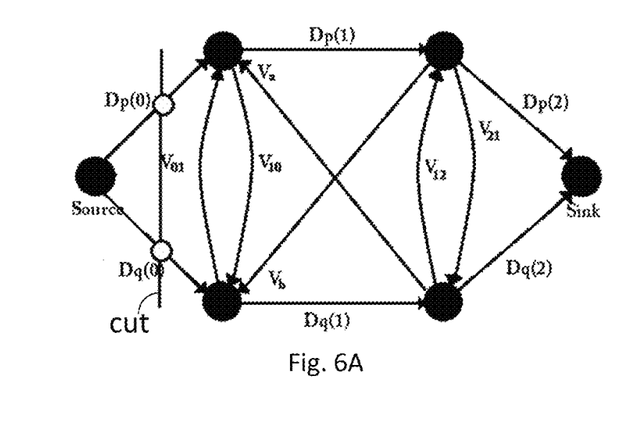
FIGS. 6A-6F schematically illustrates graph cut of the graph of FIG. 5B according to an embodiment of the present invention.
Figure 6B:
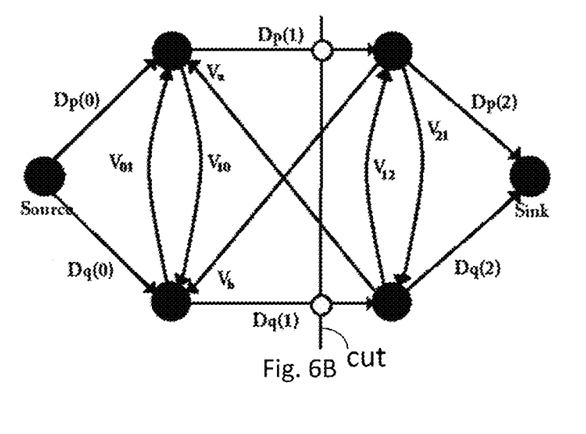
Figure 6C:
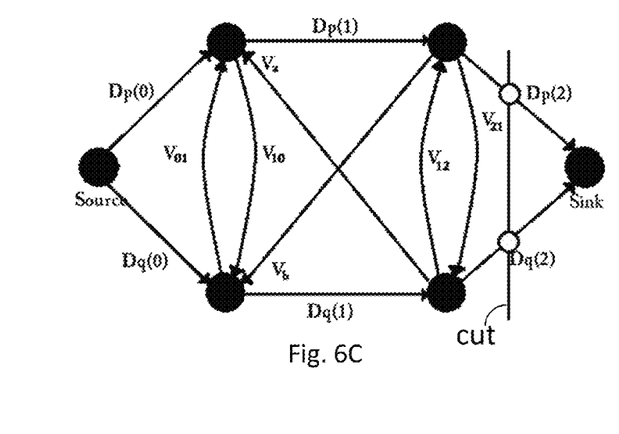
Figure 6D:
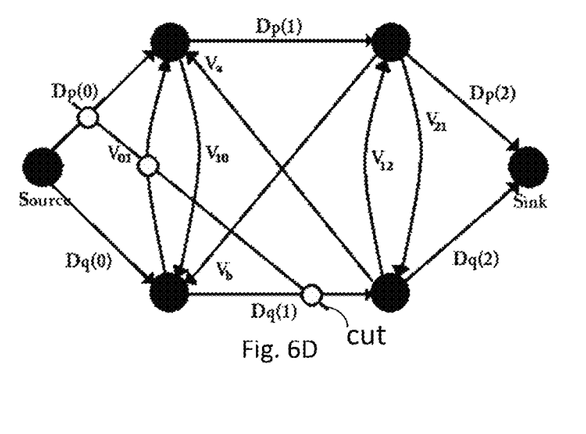
Figure 6E:
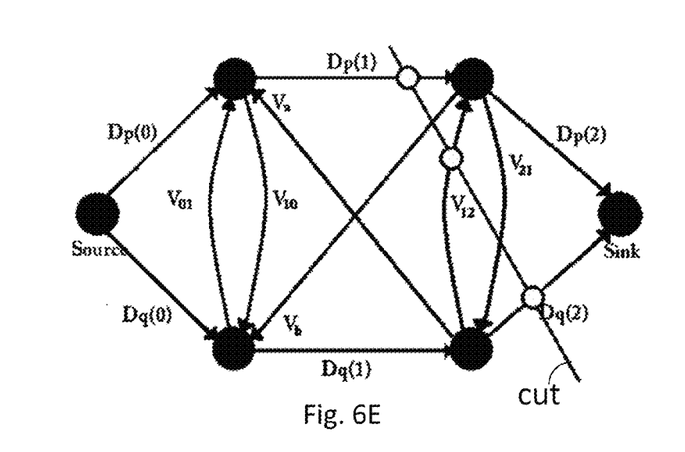
Figure 6F:
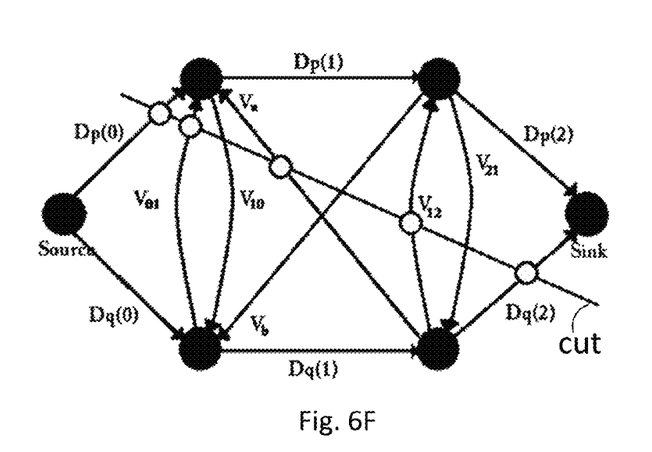

Similarly, as shown in FIG. 5B, two intermediate nodes Nq(1) and Nq(2) are provided corresponding to each tile q in the secondary tile grid, and three edges are provided, linking the source node to the first intermediate node, the first intermediate node to the second intermediate node, and the second intermediate node to the sink node, respectively. The weights assigned to the three edges are $D_q(0)$, $D_q(1)$, and $D_q(2)$, respectively, where $D_q(f_q)$ ($f_q$=0, 1, 2) are the exposure quality values for tile q in the three brackets 0, 1, 2. For simplicity, FIG. 5B shows a sub-graph including nodes for only one tile p in the primary tile grid and one of its neighbors tile q in the secondary tile grid (even though there are four neighboring tiles q for tile p, and four neighboring tiles p for tile q).

In addition to longitudinal edges linking nodes for the same tile as described above, the graph also includes lateral edges linking the intermediate nodes for tile p and intermediate nodes for its neighboring tile q. There are two types of lateral edges. The first type of lateral edges link a pair of corresponding intermediate nodes for tile p and tile q, e.g., linking the first intermediate nodes Np(1) and Nq(1) for tiles p and q to each other, and linking the second intermediate node Np(2) and Nq(2) for tiles p and q to each other. The edge weights of the various first type of lateral edges are (see FIG. 5B): V10 for the edge linking Np(1) to Nq(1), V01 for the edge linking Nq(1) to Np(1), V21 for the edge linking Np(2) to Nq(2), and V12 for the edge linking Nq(2) to Np(2).

Here, the notations V10, V10, etc. are short hands for the tile-to-tile correlation values $V_{p,q}(f_p, f_q)$, which are describe above in connection with Equation (1); for example, $V01=V_{p,q}$ ($f_p$=0, $f_q$=1), $V10=V_{p,q}(f_p$=1, $f_q$=0), etc. Thus, V01 is the correlation between tile p in bracket 0 and tile q in bracket 1, and V10 is the correlation between tile p in bracket 1 and tile q in bracket 0, etc. Note that because the correlation V is calculated (see Equation (2)) using the overlapping parts of tiles p and q, and because NCC(X,Y)=NCC(Y,X), the weights of the pair of edges linking two corresponding intermediate nodes in both directions (e.g. V01 and V10) are always equal.

The second type of lateral edges link a pair of non-corresponding intermediate nodes for tile p and tile q. Specifically, as shown in FIG. 5B, an edge with weight Va links the second intermediate node Nq(2) for tile q to the first intermediate node Np(1) for tile p, and an edge with weight Vb links the second intermediate node Np(2) for tile p to the first intermediate node Nq(1) for tile q. The values of Va and Vb are (Equation (3)):

$$Va=V02-V01-V12$$

$$Vb=V20-V10-V21 \quad (3)$$

The second type of lateral edges (with weights defined above) are added to the graph so as to achieve the proper expression of the F function (Equation (1)) by the graph.

The edges in the graph are directional, as illustrated in FIGS. 5A and 5B. In the description here, node 1 is said to be "linked to" node 2 when the direction of the edge is from node 1 to node 2; "linked from" means the reverse direction. Such a graph is referred to as a directed graph. More specifically, the graph is a flow network, which is a type of directed graph where each edge has a capacity (the weight discussed above) and receives a flow.

To summarize, according to an embodiment of the present invention, the graph constructed in step S12 has a source node, a sink node, two (first and second) intermediate nodes corresponding to each tile p of the primary tile grid, and two (first and second) intermediate nodes corresponding to each tile q of the secondary tile grid; the source node is linked to the first intermediate node of each tile p and each tile q; the first intermediate node for each tile p and each tile q is linked to the second intermediate node of the same tile; the second intermediate node of each tile p and each tile q are linked to the sink node; the first intermediate node of each tile p (or q) is linked to and from the first intermediate node of each of its four neighboring tiles q (or p) by two edges; the second intermediate node of each tile p (or q) is linked to and from the second intermediate node of each of its four neighboring tiles q (or p) by two edges; the second intermediate node of each tile p (or q) is linked to the first intermediate node of each of its four neighboring tiles q (or p); and the edge weights of the various edges are as described above. For convenience, the edges connecting nodes for the same tile (either p or q) to each other or to the source or sink are referred to as tile specific edges, and edges connecting nodes for different tiles as coupling edges (also referred to as lateral edges).

The graph is constructed to represent the objective function F($f$) (Equation (1)), so that the optimum cut (in this embodiment, minimum cut) of the graph will represent the solution of the optimization problem and give the optimum vector $f$ that optimizes (in this embodiment, minimizes) the objective function F($f$).

Graph cut is a known area of graph theory and has been applied in the field of computer vision to efficiently solve a wide variety of low-level computer vision problems that can be formulated in terms of energy minimization. Performing a cut in a graph means cutting (removing) a set of edges of the graph so that two disjoints subsets of vertices (nodes) are obtained, with no connecting edge between the two sets. The set of cut edges is referred to as the cut-set. For a flow network with one source node and one sink node, such as the graph constructed in this embodiment, an s-t cut is one that cuts a set of edges (which include only edges going from the source side to the sink side) so that the source and the sink are in different subsets, i.e., no directed path exist from the source to the sink. A cut of a flow network has a weight, which is defined as the total weight of all edges in the cut-set.

Using the graph shown in FIG. 5B as an example, there are a total of nine different ways to cut the graph, some of which are illustrated in FIGS. 6A-6F (the other ones can be deduced by simple symmetry). In FIGS. 6A-6F, the open circles mark the edges that are cut (i.e. in the cut-set), whose weights contributes to the weight of the cut. An edge is in the cut-set if it crosses the cut from the source side to the sink side, but not if it crosses the cut in the reverse direction.

The minimum cut of a flow network is the cut of minimum weight, with the weight of the cut defined as the total weight of all edges in the cut-set. Known algorithms exist for finding the minimum cut for a flow network. For example, the C++ BOOST Library provides free, open source algorithms to solve mathematical problems, including the min-cut algorithm. Thus, step S13 is a step of finding the minimum cut of the graph constructed in step S12 using a minimum cut algorithm.

As described earlier, in the graph constructed in step S12, the three edges that link the source and sink nodes via the two intermediate nodes for tile p in the primary tile grid represent the three brackets 0, 1, 2 for tile p. Of these three edges, one and only one will be cut by the minimum cut. This cut edge will indicate the bracket for tile p that will become the reference bracket. Thus, once the minimum cut is found, the reference brackets for all tiles p of the primary grid (i.e. the vector $f\{f_p\}$) can be identified. This gives the optimum vector $f$ that optimizes (in this embodiment, minimizes) the objective function $F(f)$ (Equation (1)).

Figure 7:
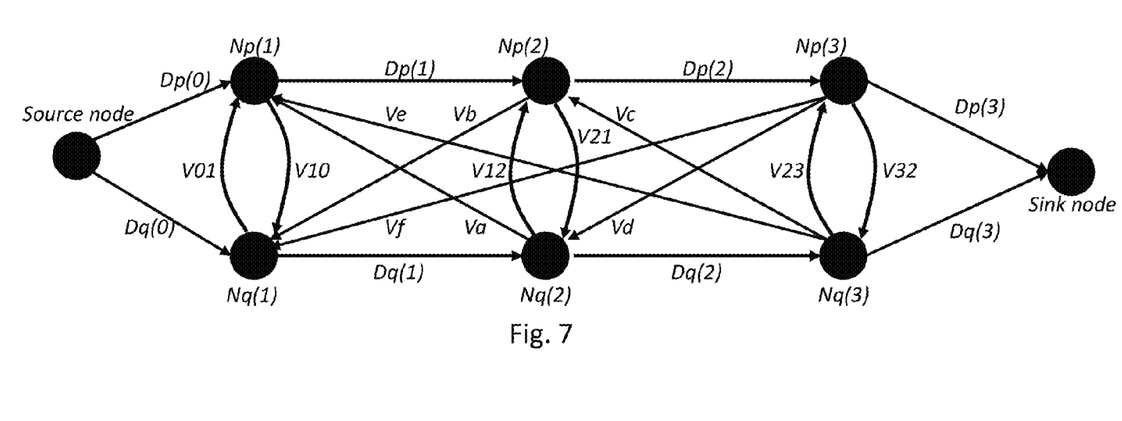
FIG. 7 schematically illustrates a graph construction for a set of four input images according to an embodiment of the present invention.

An example for a set of four input images is described with reference to FIG. 7. The graph in FIG. 7 is similar to that in FIG. 5B and the same/similar notations are used. For example, Np(3) is the third intermediate node for pixel p, Dp(3) is the exposure quality value for tile p in bracket 3, $V23=V_m(f_p=2, f_q=3)$, etc. The third intermediate node of tile p is linked to the second and first intermediate nodes of tile q with weights Vd and Vf, and the third intermediate node of tile q is linked to the second and first intermediate nodes of tile p with weights Vc and Ve. The values Va and Vb are the same as those in the three-image set example (Equation (3)), and the values of Vc to Ve are (Equation (4)):

$$Vc = V13 - V12 - V23$$

$$Vd = V31 - V21 - V32$$

$$Ve = V03 + V12 - V13 - V02$$

$$Vf = V30 + V21 - V31 - V20 \quad (4)$$

More generally, the graph for a set of M input images has M−1 intermediate nodes for each tile p and q, M longitudinal edges linking the source node to sink node via the sequence of intermediate nodes for each tile p (or q) with respective weights calculated from the first component D of Equation (1), and lateral edges linking each intermediate node of tile p (or q) to and/or from each intermediate node of tile q (or p) with respective weights calculated from the second component V of Equation (1).

Graphs for image sets of five or more images can be constructed similarly, and proper weights of the edges can be derived based on the principles described here.

The overall process of ghost artifact detection and HDR image creation according to an embodiment of the present invention is described below with reference to FIG. 8.

First, a primary tile grid is constructed to be used for each bracket (step S81), in a manner described earlier. A secondary tile grid is constructed to be used for each bracket (step S82), by shifting the primary tile grid in a manner described earlier. A tile exposure quality value is calculated for each tile in the primary grid and each tile in the secondary grid, for each bracket (step S83). The tile exposure quality values in this step correspond to the terms $D_p(f_p)$ in Equation (1), and their definition and calculation in various embodiments of the present invention are as described earlier. A tile-to-tile correlation value for each tile in the primary grid with each neighboring tile in the secondary grid, for each two-bracket combination, is also calculated (step S84). The correlation values in this step correspond to the terms $V_{p,q}(f_p, f_q)$ in Equation (1), and their definition and calculation in various embodiments of the present invention are as described earlier. Here, "two-bracket combination" refers to the combination of two bracket indices $f_p$ and $f_q$, such as ($f_p=0, f_q=1$), etc.

Then, a graph (specifically, a flow network) is constructed based on the primary and secondary grid constructed in steps S81 and S82 and the tile exposure quality and the tile-to-tile correlation values calculated in steps S83 and S84 (step S85). The graph includes a source node, a sink node, one or more nodes corresponding to each tile of the primary grid and each tile of the secondary grid, and various tile specific edges and lateral coupling edges between nodes. Each edge has a weight assigned to it, and the weights are based on the tile exposure quality and the tile-to-tile correlation values. A specific way to construct the graph in an embodiment of the present invention is described in detail earlier. Then, an optimum cut of the graph is calculated using a minimum cut algorithm, and the reference bracket for all tiles of the primary grid is identified from the optimum cut (step S86). A way of identifying the reference brackets from the optimum cut in an embodiment of the present invention is described earlier.

Once the reference bracket for each tile is identified, ghost-inducing pixels in the image set can be detected on a tile-by-tile basis by comparing, for each tile, the non-reference brackets to the reference bracket (step S87). For example, the normalized cross-correlation (NCC) of a tile between the reference bracket and a non-reference bracket can be calculated as an indication of whether the non-reference bracket for that tile contains a ghost-inducing object. Other methods may be used to detect ghost artifacts in a tile, such as those described in the Karadag and Akyuz 2012 paper. In step S87, a ghost map is constructed for each bracket, which is a map having the same size as the original image and indicating whether each pixel in the bracket is or is not ghost-inducing and hence whether or not that pixel of the bracket should be used in creating the HDR image. Then, an HDR image is generated by using the multiple brackets along with the corresponding ghost maps (step S88). In this step, pixels of a bracket indicated by the corresponding ghost map as being a ghost-inducing will not be used to generate the HDR image. As a result, ghost artifacts are avoided.

Figure 8:
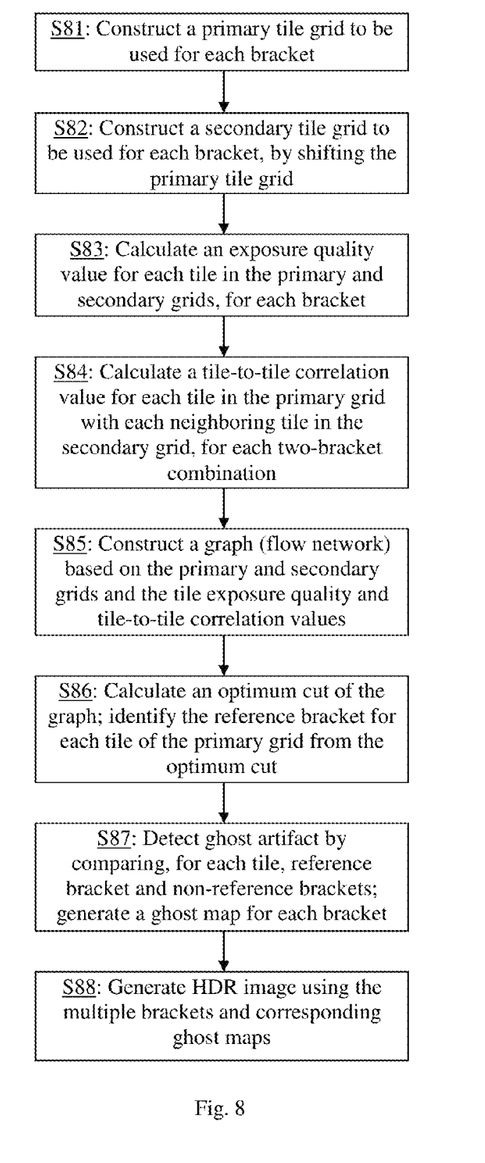
FIG. 8 schematically illustrates a method for ghost artifact detection and HDR image creation according to an embodiment of the present invention FIGS. 9A and 9B schematically illustrate a data processing apparatus and a camera, respectively, in which embodiments of the present invention may be implemented.

In the process of FIG. 8, steps S81 to S86 pertain to determining the reference bracket for each tile; and steps S87 to S88 pertain to detecting and removing ghost artifacts and generating HDR image. The latter set of steps can be implemented using methods known in the art.

Various changes may be made to the above-described embodiments. For example, while the tile-to-tile correlation $V_{p,q}(f_p, f_q)$ is defined in the above embodiments using overlapping tiles in the primary grid and secondary grid, it can also be defined using only tiles in the primary grid, by a function that measures the visual similarity of neighboring tiles in the primary grid that border each other. Two of such alternative embodiments are described below. In these descriptions, tile q is a neighboring tile of tile p in the same grid; the set of neighbors can be defines as the set of four tiles that abut tile p on the four sides, or alternatively, any subset of such set.

In the first alternative method of calculating the tile-to-tile correlation $V_{p,q}(f_p, f_q)$, the following NCC values are first calculated:

$$A = NCC(I_{f_p}(R_p), I_{f_q}(R_p))$$

$$B = NCC(I_{f_q}(R_q), I_{f_p}(R_q))$$

where $I_{f_q}(R_q)$ is the image of tile p of bracket $f_p$, etc. Thus, the values A is the normalized cross correlation computed between the tiles p and q of brackets $f_p$ and $f_q$.

For $f_p \neq f_q$, let n be the index of another bracket of the input image set, i.e. $n \neq f_p$ and $n \neq f_q$, and the following value is calculated:

$$C = \max\{n\}(NCC(I_{f_p}(R_p), I_n(R_p)) + NCC(I_{f_q}(R_q), I_n(R_q)))$$

Then a value H is calculated as:

$$\text{for } f_p = f_q, H_{p,q}(f_p, f_q) = 0;$$

$$\text{for } f_p \neq f_q, H_{p,q}(f_p, f_q) = 1 - \max(A, B, C)$$

The tile-to-tile correlation $V_{p,q}(f_p, f_q)$ is then calculated as an increasing function of $H_{p,q}(f_p, f_q)$.

In the second alternative method of calculating the tile-to-tile correlation $V_{p,q}(f_p, f_q)$, each tile is first mapped by a function $E_f$, which maps a pixel intensity value to an exposure value depending of the bracket $f$. In other words, $E_f$ is the inverse camera response function (CRF) applied to the pixel value.

Then let $I_{test}$ be the image result of the juxtaposition (neighboring tiles) of $E_{f_p}(I_{f_p}(R_p))$ and $E_{f_q}(I_{f_q}(R_q))$. Let dist be a comparison function (for example, absolute difference, 1−NCC). Calculate the following:

$$A = \text{dist}(I_{test}, E_0(I_0(R_p + R_q)))$$

$$B = \text{dist}(I_{test}, E_1(I_1(R_p + R_q)))$$

$$C = \text{dist}(I_{test}, E_2(I_2(R_p + R_q)))$$

...

$$H_{p,q}(f_p, f_q) = \min(A, B, C, \ldots)$$

where $R_p + R_q$ represents an image patch obtained by combining (juxtaposition) the tiles $R_p$ and $R_q$. For example, if $R_p$ and $R_q$ are square, $R_p + R_q$ is the rectangular patch obtained by combining $R_p$ and $R_q$.

The tile-to-tile correlation $V_{p,q}(f_p, f_q)$ is then calculated as an increasing function of $H_{p,q}(f_p, f_q)$.

When the tile-to-tile correlation $V_{p,q}(f_p, f_q)$ is calculated using only tiles in the primary grid, the graph construction is similar to that described above, except that tile q is now a neighboring tile of tile p in the same grid (rather than a secondary grid).

Figure 9A:
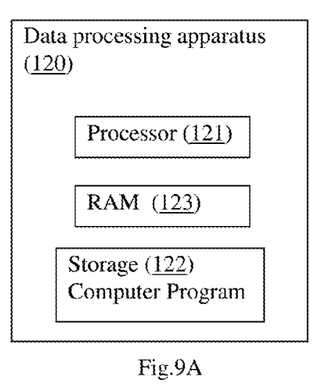

The ghost artifact detection and HDR image creation methods described here can be implemented in a data processing system such as a computer 120 as shown in FIG. 8A. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

Figure 9B:
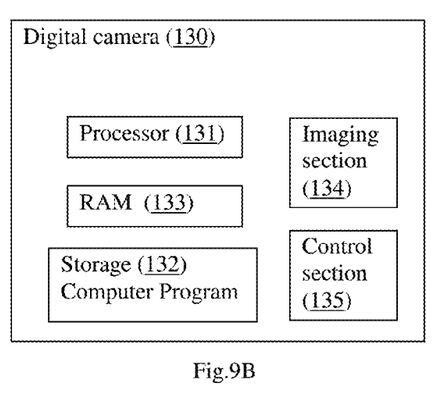

The method may also be implemented in hardwired circuits, such as one or more chips within a digital camera. FIG. 8B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of images at different exposure levels. Autobracketing is well known and its details are omitted here. The processor 131 may process the set of images using the algorithm described above to generate an HDR image.

In one aspect, the invention is embodied in a data processing apparatus, which may be the data processing section of a digital camera. In another aspect, the invention is a computer program product embodied in computer usable non-transitory medium having a computer readable program code embedded therein for controlling a data processing apparatus. In another aspect, the invention is a method carried out by a data processing apparatus.

It will be apparent to those skilled in the art that various modification and variations can be made in the ghost artifact detection and HDR image creating method and related apparatus of the present invention without departing from the spirit or scope of the invention. Thus, it is intended that the present invention cover modifications and variations that come within the scope of the appended claims and their equivalents.

What is claimed is:

1. A method for generating a high dynamic range (HDR) image from a set of multiple input images, each input image being assigned a bracket index, comprising:
    (a) dividing each input image into a set of tiles, wherein all images are divided into the same set of tiles;
    (b) determining a reference bracket index for each tile of the set of tiles, comprising:
        (b1) defining an objective function as a function of a set of bracket indices for the set of tiles, the objective function including a component that measures exposure quality of individual tiles and a component that measures correlation between neighboring tiles; and
        (b2) calculating a set of reference bracket indices for the tiles that optimizes the objective function;
    (c) based on the set of reference bracket indices for the tiles, detecting ghost-inducing pixels in the set of input image on a tile-by-tile basis by comparing, for each tile, each input image whose bracket index is not the reference bracket index with the input image whose bracket index is the reference bracket index, and generating a ghost map for each input image which indicates ghost-inducing pixels in that image; and
    (d) generating a HDR image using the set of input images and the corresponding ghost maps.

2. The method of claim 1, wherein step (b2) includes:
    constructing a graph based on the objective function such that an optimum cut of the graph gives a set of bracket indices for the tiles that optimizes the objective function; and
    calculating an optimum cut of the graph using a graph cut algorithm to obtain the set of reference bracket indices for the tiles that optimizes the objective function.

3. The method of claim 1, wherein the objective function in step (b1) is defined as:

$$F(f) = \Sigma_p D_p(f_p) + \Sigma_p \Sigma_{q \in N(p)} V_{p,q}(f_p, f_q) \qquad (1)$$

wherein p and q are tile indices, N(p) is a set of tile indices of neighbors of tile p, $f_p$ and $f_q$ are bracket indices for tiles p and q, $f$ is a vector formed by $f_p$, $D_p(f_p)$ is a function which measures exposure quality of tile p of the bracket $f_p$, and $V_{p,q}(f_p, f_q)$ is a function which measures a coupling between two neighboring tiles p and q of brackets $f_p$ and $f_q$.

4. The method of claim 3, wherein $D_p(f_p)$ is an average value of pixel exposure quality values for all pixels of tile p of bracket $f_p$.

5. The method of claim 3,
wherein the set of tiles in step (a) have identical tile size and form a primary tile grid,
the method further comprising forming a secondary tile grid by shifting the primary tile grid by a fraction of the tile size,
wherein in the objective function in step (b1), tile indices p and q are indices in the primary and secondary tile grids, respectively, and the set of neighbors N(p) of tile p are tiles in the secondary tile grid that overlaps with tile p in the primary grid, and
wherein $V_{p,q}(f_p, f_q)$ is a correlation value calculated from images of brackets $f_p$ and $f_q$ in an area where tiles p and q overlap with each other.

6. The method of claim 5, wherein step (b2) includes:
constructing a graph based on the objective function, the graph having a source node, a sink node, a sequence of M−1 intermediate nodes corresponding to each tile p of the primary tile grid and each tile q of the secondary tile grid, M being a number of images in the set of input images, M longitudinal edges linking the source node to the sink node via the sequence of intermediate nodes for each tile p and each tile q with respective edge weights calculated based on the functions $D_p(f_p)$, a plurality of lateral edges linking each intermediate node of tile p to and/or from each intermediate node of tile q and linking each intermediate node of tile q to and/or from each intermediate node of tile p with respective edge weights calculated from the functions $V_{p,q}(f_p, f_q)$; and
calculating an optimum cut of the graph using a graph cut algorithm to obtain the set of reference bracket indices for the tiles that optimizes the objective function.

7. The method of claim 5, wherein the set of input images comprising three images having bracket indices 0, 1 and 2, respectively;
wherein step (b2) includes:
constructing a graph based on the objective function, the graph having a source node, a sink node, a first and a second intermediate node corresponding to each tile p of the primary tile grid, and a first and a second intermediate node corresponding to each tile q of the secondary tile grid,
the source node being linked to the first intermediate node of each tile p and each tile q by respective edges having respective edge weights $D_p(\mathbf{0})$ and $D_q(\mathbf{0})$,
the first intermediate node for each tile p and each tile q being linked to the second intermediate node of the same tile by respective edges having respective edge weights $D_p(\mathbf{1})$ and $D_q(\mathbf{1})$,
the second intermediate node of each tile p and each tile q being linked to the sink node by respective edges having respective edge weights $D_p(\mathbf{1})$ and $D_q(\mathbf{1})$,
the first intermediate node of each tile p being linked to and from the first intermediate node of each of its neighboring tiles q by two edges having respective edge weights $V_{p,q}(\mathbf{1,0})$ and $V_m(\mathbf{0,1})$, the first intermediate node of each tile q being linked to and from the first intermediate node of each of its neighboring tiles p by two edges having respective edge weights $V_{p,q}(\mathbf{0,1})$ and $V_{p,q}(\mathbf{1,0})$,
the second intermediate node of each tile p being linked to and from the second intermediate node of each of its neighboring tiles q by two edges having respective edge weights $V_{p,q}(\mathbf{2,1})$ and $V_{p,q}(\mathbf{1,2})$, the second intermediate node of each tile q being linked to and from the second intermediate node of each of its neighboring tiles p by two edges having respective edge weights $V_{p,q}(\mathbf{1,2})$ and $V_{p,q}(\mathbf{2,1})$, and
the second intermediate node of each tile p being linked to the first intermediate node of each of its four neighboring tiles q by an edge having an edge weight $Vb=V_{p,q}(\mathbf{2,0})-V_{p,q}(\mathbf{1,0})-V_{p,q}(\mathbf{2,1})$, the second intermediate node of each tile q being linked to the first intermediate node of each of its four neighboring tiles p by an edge having an edge weight $Va=V_{p,q}(\mathbf{0,2})-V_{p,q}(\mathbf{0,2})-V_{p,q}(\mathbf{1,2})$; and
calculating an optimum cut of the graph using a graph cut algorithm to obtain the set of reference bracket indices for the tiles that optimizes the objective function.

8. A computer program product comprising a computer usable non-transitory medium having a computer readable program code embedded therein for controlling a data processing apparatus, the computer readable program code configured to cause the data processing apparatus to execute a process for generating a high dynamic range (HDR) image from a set of multiple input images, each input image being assigned a bracket index, the process comprising:
(a) dividing each input image into a set of tiles, wherein all images are divided into the same set of tiles;
(b) determining a reference bracket index for each tile of the set of tiles, comprising:
(b1) defining an objective function as a function of a set of bracket indices for the set of tiles, the objective function including a component that measures exposure quality of individual tiles and a component that measures correlation between neighboring tiles; and
(b2) calculating a set of reference bracket indices for the tiles that optimizes the objective function;
(c) based on the set of reference bracket indices for the tiles, detecting ghost-inducing pixels in the set of input image on a tile-by-tile basis by comparing, for each tile, each input image whose bracket index is not the reference bracket index with the input image whose bracket index is the reference bracket index, and generating a ghost map for each input image which indicates ghost-inducing pixels in that image; and
(d) generating a HDR image using the set of input images and the corresponding ghost maps.

9. The computer program product of claim 8, wherein step (b2) includes:
constructing a graph based on the objective function such that an optimum cut of the graph gives a set of bracket indices for the tiles that optimizes the objective function; and
calculating an optimum cut of the graph using a graph cut algorithm to obtain the set of reference bracket indices for the tiles that optimizes the objective function.

10. The computer program product of claim 8, wherein the objective function in step (b1) is defined as:

$$F(f)=\Sigma_p D_p(f_p)+\Sigma_p \Sigma_{q\in N(p)} V_{p,q}(f_p,f_q) \tag{1}$$

wherein p and q are tile indices, N(p) is a set of tile indices of neighbors of tile p, $f_p$ and $f_q$ are bracket indices for tiles p and q, $f$ is a vector formed by $f_p$, $D_p(f_p)$ is a function which measures exposure quality of tile p of the bracket $f_p$, and $V_{p,q}(f_p, f_q)$ is a function which measures a coupling between two neighboring tiles p and q of brackets $f_p$ and $f_q$.

11. The computer program product of claim 10, wherein $D_p(f_p)$ is an average value of pixel exposure quality values for all pixels of tile p of bracket $f_p$.

12. The computer program product of claim 10,
wherein the set of tiles in step (a) have identical tile size and form a primary tile grid,
the process further comprising forming a secondary tile grid by shifting the primary tile grid by a fraction of the tile size,
wherein in the objective function in step (b1), tile indices p and q are indices in the primary and secondary tile grids, respectively, and the set of neighbors N(p) of tile p are tiles in the secondary tile grid that overlaps with tile p in the primary grid, and
wherein $V_{p,q}(f_p, f_q)$ is a correlation value calculated from images of brackets $f_p$ and $f_q$ in an area where tiles p and q overlap with each other.

13. The computer program product of claim 12, wherein step (b2) includes:
constructing a graph based on the objective function, the graph having a source node, a sink node, a sequence of M−1 intermediate nodes corresponding to each tile p of the primary tile grid and each tile q of the secondary tile grid, M being a number of images in the set of input images, M longitudinal edges linking the source node to the sink node via the sequence of intermediate nodes for each tile p and each tile q with respective edge weights calculated based on the functions $D_p(f_p)$, a plurality of lateral edges linking each intermediate node of tile p to and/or from each intermediate node of tile q and linking each intermediate node of tile q to and/or from each intermediate node of tile p with respective edge weights calculated from the functions $V_{p,q}(f_p, f_q)$; and
calculating an optimum cut of the graph using a graph cut algorithm to obtain the set of reference bracket indices for the tiles that optimizes the objective function.

14. The computer program product of claim 12, wherein the set of input images comprising three images having bracket indices 0, 1 and 2, respectively;
wherein step (b2) includes:
constructing a graph based on the objective function, the graph having a source node, a sink node, a first and a second intermediate node corresponding to each tile p of the primary tile grid, and a first and a second intermediate node corresponding to each tile q of the secondary tile grid,
the source node being linked to the first intermediate node of each tile p and each tile q by respective edges having respective edge weights $D_p(0)$ and $D_q(0)$,
the first intermediate node for each tile p and each tile q being linked to the second intermediate node of the same tile by respective edges having respective edge weights $D_p(1)$ and $D_q(1)$,
the second intermediate node of each tile p and each tile q being linked to the sink node by respective edges having respective edge weights $D_p(1)$ and $D_q(1)$,
the first intermediate node of each tile p being linked to and from the first intermediate node of each of its neighboring tiles q by two edges having respective edge weights $V_{p,q}(1,0)$ and $V_m(0,1)$, the first intermediate node of each tile q being linked to and from the first intermediate node of each of its neighboring tiles p by two edges having respective edge weights $V_{p,q}(0,1)$ and $V_{p,q}(1,0)$,
the second intermediate node of each tile p being linked to and from the second intermediate node of each of its neighboring tiles q by two edges having respective edge weights $V_{p,q}(2,1)$ and $V_{p,q}(1,2)$, the second intermediate node of each tile q being linked to and from the second intermediate node of each of its neighboring tiles p by two edges having respective edge weights $V_{p,q}(1,2)$ and $V_{p,q}(2,1)$, and
the second intermediate node of each tile p being linked to the first intermediate node of each of its four neighboring tiles q by an edge having an edge weight $Vb=V_{p,q}(2,0)-V_{p,q}(1,0)-V_{p,q}(2,1)$, the second intermediate node of each tile q being linked to the first intermediate node of each of its four neighboring tiles p by an edge having an edge weight $Va=V_{p,q}(0,2)-V_{p,q}(0,2)-V_{p,q}(1,2)$; and
calculating an optimum cut of the graph using a graph cut algorithm to obtain the set of reference bracket indices for the tiles that optimizes the objective function.

15. A digital camera comprising the computer usable non-transitory medium of claim 8, the digital camera further comprising:
an imaging section for obtaining images; and
a control section for controlling the imaging section to obtain the set of images having different exposure levels.

* * * * *